May 5, 1970 M. A. HUFFORD 3,510,692
HIGH CURRENT SWITCHING CIRCUIT UTILIZING TWO SILICON
CONTROLLED RECTIFIERS
Filed June 22, 1967
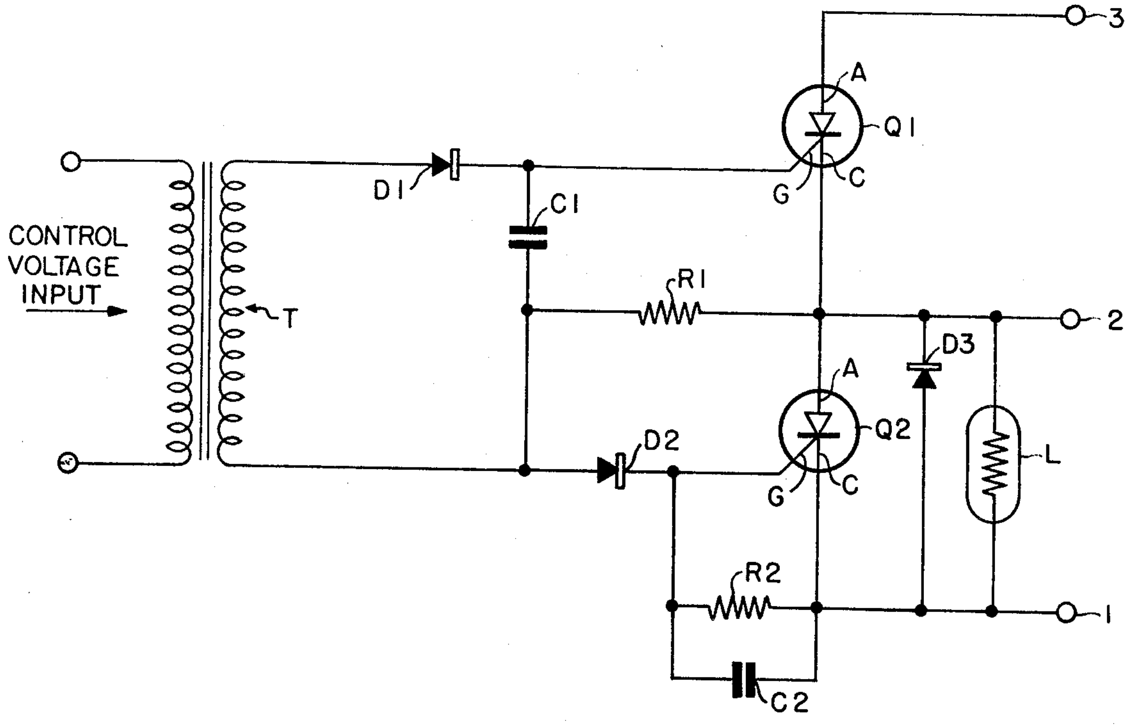
INVENTOR.
MARVIN A. HUFFORD
BY Charles M. Hogan
Irwin P. Garfinkle
ATTORNEYS.

United States Patent Office 3,510,692

Patented May 5, 1970

3,510,692

HIGH CURRENT SWITCHING CIRCUIT UTILIZING TWO SILICON CONTROLLED RECTIFIERS

Marvin A. Hufford, Richmond, Ind., assignor to Avco Corporation, Richmond, Ind., a corporation of Delaware Filed June 22, 1967, Ser. No. 648,082
Int. Cl. H03k 3/35
U.S. Cl. 307—284 7 Claims

ABSTRACT OF THE DISCLOSURE

Two silicon controlled rectifiers are utilized for connecting a source to a load in a fail safe manner. The two rectifiers are connected in series across the source. In the absence of a control voltage, but in the presence of stray voltages appearing across the load, one of the silicon controlled rectifiers is in its high impedance state while the second is in its low impedance state. The load is connected across the rectifier which is normally in its low impedance state so that stray currents are short-circuited away from the load. In response to a control voltage the states of the rectifiers are reversed and any existing voltage provided by the source is connected to the load through the one rectifier while the second rectifier is made an open circuit.

Summary of the invention

In essence the present invention is equivalent to a single-pole, double-throw switch. When the pole is in one position, a short circuit exists across the load. When in its second position, the load is connected to a source of energization and is in a state to receive power therefrom. The disclosed circuit performs these functions electronically.

As disclosed, the circuit provides first and second silicon controlled rectifiers, the load being connected to a source of energization through the first rectifier, and is in a position to receive power therefrom, or short-circuited by the second. In the initial state the first rectifier is in a high impedance condition while the second rectifier is in a low impedance condition. An oppositely poled semiconductor diode is connected across the second rectifier to prevent a reverse voltage build up across the load. The impedances of the rectifiers are controlled by pulses supplied through a transformer and a diode, the resulting direct current voltages causing the first silicon controlled rectifier to change to its low impedance state and causing the second rectifier to change to its high impedance state. The arrangement therefore provides a shunt for both alternating and direct stray currents that might prematurely energize the load.

Prior inventions

The present invention constitutes an improvement over the switching arrangement shown in co-pending application of Godfrey R. Gauld, Ser. No. 585,001 filed Oct. 7, 1966, and assigned to the same assignee as this invention. The improvement resides in the use of two sicilon controlled rectifiers, which provide a short-circuiting path for both direct and alternating potentially existing, spurious stray currents in the absence of the control voltage. Furthermore, silicon controlled rectifiers have a low voltage drop independent of any gain considerations when conducting, and this has the advantage of allowing the switching of large currents with little power loss. Additionally, silicon controlled rectifiers require no input to insure continuous conduction and will remain in a low impedance state for direct current.

The drawing

For a better understanding of the nature and the objects of the invention, reference is made to the single figure which is a schematic representation of a preferred electronic switching circuit in accordance with the invention.

Description of the invention

In the drawing the load L represents a squib or flashbulb which is ignited by the application of a positive voltage supplied from a voltage source (not shown) connected between terminals 1 and 3 whenever a control voltage is applied and the voltage source is energized. In essence, the control voltage serves to "arm" the system, so that the squib L can be fired upon the energization of the source. The load L is connected between a terminal 1 and a terminal 2. Terminal 2 is connected to the junction of the cathode C of a silicon controlled rectifier Q1 and the anode A of a silicon controlled rectifier Q2. The anode A of rectifier Q1 is connected to the positive side of the voltage supply at terminal 3 while the cathode C of rectifier Q2 is connected to the negative terminal 1. A semiconductor diode D3 is connected between the terminals 1 and 2 and is poled in opposition to the rectifier Q2.

The silicon controlled rectifiers Q1 and Q2 are controlled by means of an alternating voltage or a voltage pulse input coupled via transformer T through a rectifying diode D1 to a storage and filter capacitor C1. The direct voltage developed across capacitor C1 is then applied across the gate G and cathode C of the silicon controlled rectifier Q1 through a resistor R1.

A diode D2 is connected between the junction of resistor R1 and capacitor C1 and the gate G of rectifier Q2. Parallel-connected resistor R2 and capacitor C2 are connected across the cathode C and gate G of rectifier Q2.

In a complex system there is the possibility that a stray electromotive power will exist between terminals 1 and 2. This invention provides means for short-circuiting the resulting stray currents away from the load L in the absence of a control voltage supplied to the transformer T, and thus prevents premature and accidental energization of the load. The stray currents are usually of very short duration and generally are encountered in the radio frequency range. In the absence of control voltage pulses, if a stray positive voltage appears at the terminal 2, it is applied to the anode A of rectifier Q2 through the resistor R1 and the diode D2 to the gate G of rectifier Q2. The rectifier Q2 "turns on" and short-circuits the stray currents to the terminal 1. If a stray negative voltage appears at the terminal 2, it is short-circuited to the terminal 1 through the diode D3.

When it is desired to connect the load L to the direct current source at terminals 1 and 3, a pulse or an alternating voltage applied through the transformer T is rectified by the diode D1 and applied to capacitor C1, charging capacitor C1. Bear in mind that in practice the source is not usually energized until the circuit is readied or "armed" by the application of the control voltage. The positive voltage on capacitor C1, applied to the gate G of rectifier Q1 causes this rectifier to change to its low impedance state, and hence is ready to conduct when its source at terminal 3 is energized. Simultaneously, the voltage developed across the resistor R1 serves to increase the impedance of rectifier Q2 and effectively opens the circuit between the terminals 2 and 1. Thus, current may flow (when the source at terminal 3 is energized) from the terminal 3 through the rectifier Q1, the terminal 2, and the load L to the terminal 1. This current, however, will only flow if a positive voltage exists between terminals 3 and 1.

In summary, in the absence of a control voltage rectifier Q1 is kept in a high impedance state for voltages on terminal 3 since a low impedance path between its gate G and the cathode C will prevent any flow of gate current. At the same time, rectifier Q2 is in a low impedance state because of the resistor R1 and diode D2 connected between its gate G and anode A. Any stray voltage at terminal 2 causes current to flow through the resistor R1 and the diode D2 to decrease the impedance of the rectifier Q2. The diode D3 allows conduction of stray currents in the reverse direction from that of the rectifier Q2.

The stray voltages are spurious and last for very short times. Therefore, when the control voltage is applied, the rectifier Q2 will continue in its low impedance state until such time as the stray voltages are reduced to zero. If the stray voltage is an R.F. signal, the voltage at terminal 2 would be at zero twice every cycle. Therefore, after the control alternating or pulse voltages are applied, the high and low impedance conditions of the rectifiers Q1 and Q2 are reversed. Once reversed, the control voltage prevents the rectifier Q2 from changing back to its low impedance state. In this condition, energization of the source at the terminal 3 will fire the squib or load L. For isolation purposes the control voltage is in the form of pulse or alternating voltages which are transferred through the transformer T. If control voltage is present the circuit parameters are such that the resulting rectified voltage is higher than any voltage normally developed between the terminals 1 and 2.

The resistor R1 connected to terminal 2 performs the function of a bleeder resistor. Because the voltage across resistor R1, due to the application of the control voltage, is larger than any voltage which is developed between the terminals 1 and 2, the voltage at the gate G of rectifier Q1 keeps this rectifier in its low impedance state, while the voltage developed across R1 blocks currents between the gate and the cathode of rectifier Q2, thus keeping rectifier Q2 in its high impedance state. This results from the fact that the application of a control voltage serves to charge the capacitor C1, thereby making the capacitor C1 positive at its junction with the diode D1 and negative at its junction with the diode D2. The negative voltage at the diode D2 precludes current flow through diode D2 which in turn precludes gate current in rectifier Q2. With gate current precluded from the rectifier Q2 and with the momentary removal of stray voltages from the terminal 2, the rectifier Q2 will revert to its high impedance state and further conduction will not be possible during the period when the capacitor C1 is charged. This results in terminals 2 and 3 being closed with control voltage applied, while rectifier Q2 is maintained open. When the source at terminal 3 is energized, current will then flow through the squib L.

The reversely connected diode D2 prevents excessive voltage from being applied to the gate. The resistor and capacitor R2 and C2, respectively, hold the gate voltage at zero value to keep the rectifier Q2 turned off in the absence of a control voltage. The capacitor C2 insures that Q2 will not turn on due to pulses present at anode A of Q2. If the rectifier Q2 has a sufficiently high gate to cathode breakdown voltage rating, the resistor R2, capacitor C2, and diode D2 would not be required.

This circuit was designed for arming applications in which a firing squib, such as the load L, was to be detonated. However, the circuit may be used for many other applications in which unintential application of a voltage to a load must be avoided.

While the invention is not limited to any particular parameters, the following are illustrative of those parameters used in a system as actually reduced to practice:

C1—2$\mu$f.

C2—1000 pb.

R1—10K ohms.

R2—2K ohms.

Various modifications and adaptations will be apparent to persons skilled in the art. It is intended, therefore, that this invention be limited only by the following claims.

1. An electronic switching system for short-circuiting the stray currents of a stray voltage source from a load in the absence of a control voltage, the combination comprising:

first and second silicon controlled rectifiers connected in series between first and second terminals, said first rectifier being connected to the first terminal and the second rectifier being connected to the second terminal, the junction of said rectifiers being connected to a common terminal;

said load being connected between the second and common terminals;

means in the absence of a control voltage and in the presence of stray voltages appearing across said load for maintaining the first rectifier in a high impedance state and conditioning said second rectifier to be ready for conduction in a low impedance state whereby current cannot pass from said first terminal through said first rectifier and said load, and whereby stray currents at said common terminal are short-circuited from said load through the second rectifier;

a source of control voltage; and means responsive to the simultaneous application of said control voltage to said rectifiers for reversing the impedance states thereof, the impedance state of said second rectifier reversing when the stray voltage is reduced to zero.

2. The invention as defined in claim 1, and a semiconductor diode connected between the second terminal and the common terminal, said diode being oppositely poled with respect to said second rectifier.

3. The invention as defined in claim 1 wherein said control voltage is pulsating, and is applied to said rectifiers through a transformer.

4. The invention as defined in claim 1 wherein each of said silicon controlled rectifiers includes anode, cathode and gate electrodes, the cathode electrode of the first rectifier being connected to the anode electrode of the second rectifier at said common terminal; a capacitor and a resistor being connected in series between the gate and cathode electrodes of said first rectifier, said resistor also being connected between the anode and gate electrodes of said second rectifier, whereby in the absence of said control voltage, currents into said common terminal flow through said resistor thereby biasing said second rectifier to be ready for conduction in its low impedance state and maintaining said first rectfier in said high impedance state, and whereby the application of a control voltage to said capacitor and said resistor reverses the impedance states of said first and second rectifiers when said stray voltage is reduced to zero.

5. The invention as defined in claim 4, and a semiconductor diode connected between the second terminal and the common terminal, said diode being oppositely poled with respect to said second rectifier.

6. An electronic switching system comprising:

first and second silicon controlled rectifiers, each having an anode, a cathode and a gate electrode, said rectifiers being connected in series between first and second terminals, the anode of said first rectifier being connected to the first terminal, the cathode of said second rectifier being connected to the second terminal, the cathode of the first rectifier, and the anode of the second rectifier being connected to a common terminal;

a semiconductor diode connected between said common terminal and said second terminal, said diode being oppositely poled with respect to said second rectifier;

a load connected across said diode;

a source of pulsating control voltage;

coupling means for coupling said source to the gates of said rectifiers, said coupling means including a transformer;

a diode rectifier and a capacitor in series connected across the secondary winding of said transformer;

the junction of said diode rectifier and said capacitor being connected to the gate of said first rectifier; and a resistor connected between said common terminal and the other side of said capacitor, said other side of said capacitor also being connected to the gate electrode of the second rectifier.

7. The invention as defined in claim 6 wherein said other side of said capacitor is connected to the gate of said second rectifier through a diode, and a parallel connected resistor and capacitor connected between the gate and cathode electrode of said second rectifier.

References Cited

UNITED STATES PATENTS

| | | | |
|---|---|---|---|
| 3,260,924 | 7/1966 | Bridgeman | 307—252 X |
| 3,346,745 | 10/1967 | Harris | 307—284 X |
| 3,359,498 | 12/1967 | Harris | 307—284 X |
| 3,391,306 | 7/1968 | Piccione | 307—252 X |

JOHN S. HEYMAN, Primary Examiner

U.S. Cl. X.R.

307—252